Aug. 10, 1948.　　　F. W. FEILER　　　2,446,817

VULCANIZED FILLED RUBBER GRINDING WHEEL

Filed Dec. 22, 1945

INVENTOR.
Frederick W. Feiler,
BY George D. Richards
Attorney

Patented Aug. 10, 1948

2,446,817

UNITED STATES PATENT OFFICE 2,446,817

VULCANIZED FILLED RUBBER GRINDING WHEEL

Frederick W. Feiler, Bloomfield, N. J., assignor to Weldon Roberts Rubber Co., Newark, N. J., a corporation of New Jersey Application December 22, 1945, Serial No. 636,696

2 Claims. (Cl. 51—206)

This invention relates to improvements in vulcanized rubber bonded grinding wheels and to a method of producing the same.

Vulcanized rubber bonded grinding wheels as heretofore provided have generally comprised a circular body of suitable diameter and width having a center opening through which the power driven spindle, for rotating the wheel in use, is passed, and to which the wheel is thereupon suitably clamped. In the use of such wheels, as thus mounted and driven, pressure of the work applied to the peripheral surface of the wheel, exerts a radial thrust, which, not infrequently, produces wear in the wall surface of the center opening through which the driving spindle is engaged. Such wear may be sufficient, in many cases, to permit radial shift or displacement of the wheel relative to the axis of rotation of the driving spindle, sufficient in extent to throw the wheel out of balance, so that undue vibration thereof and of the driving mechanism is likely to occur with resultant unsatisfactory operating conditions in use.

The instant invention has for an object to provide means for overcoming the above mentioned defects, and, to this end, to provide the wheel body with a single or unitary rigid wear resistant center bushing in such novel relation thereto as not to impede firm lateral clamping compression of the wheel body by the clamping means utilized to affix the wheel body to a driving spindle, and which bushing is itself properly positioned and securely held within the center opening of the wheel body with its respective ends inwardly offset or spaced relative to the respective adjacent lateral faces of said wheel body; and the invention has for a further object to provide a novel method of assembling, positioning and affixing said bushing relative to the wheel body.

Other objects of this invention, not at this time more particularly enumerated, will be understood from the following detailed description of the same.

The invention is illustrated in the accompanying drawings, in which.

Similar characters of reference are employed in the above described views, to indicate corresponding parts.

Figure 1:
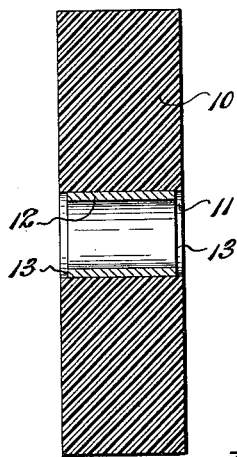
Fig. 1 is a transverse vertical sectional view of an unvulcanized rubber stock and abrasive grinding wheel body having a rigid wear resistant bushing as initially assembled therewith preparatory to vulcanizing and thereby completing the wheel.

In producing the novel grinding wheel according to this invention, and as shown in Fig. 1, an unvulcanized rubber and abrasive composition is shaped to provide an initial wheel body 10 of the approximate diameter and width desired to characterize a selected size of finished wheel, said body being provided with a center opening 11. Into said center opening 11 is inserted a bushing 12 of rigid wear resistant material, such e. g. as steel or other suitable metallic or rigid non-metallic material. Said bushing 12 is of an external diameter corresponding to the initial internal diameter of the center opening 11 of the unvulcanized body 10, and of an internal diameter corresponding to the shank of a driving spindle upon which the finished wheel is to be mounted for use. Said bushing 12 is of a length appreciably less than the length of the center opening 11 of the unvulcanized body 10, and is positioned within said opening 11 so that the bushing ends 13 are respectively inwardly offset or spaced from the lateral faces of said unvulcanized body 10.

Figure 2:
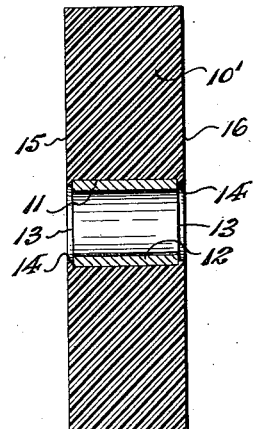
Fig. 2 is a similar view showing the completed vulcanized wheel having the bushing affixed thereto within the center opening thereof.

The unvulcanized body 10, with the bushing 12 assembled therewith as described, is now ready to be subjected to vulcanization, whereby to finish and condition the same for use. Preferably, the unvulcanized body is deposited in a suitable vulcanizing chamber or retort, and therein subjected to vulcanization in and by open steam with which the chamber or retort is filled. As vulcanization of the body 10 takes place, the desired rubber setting effect obtained by the treatment, whereby the unvulcanized body 10 is converted to a vulcanized body 10' (see Fig. 2), occurs, and incident thereto is also involved a certain amount of shrinking of the body 10 as it converts to the vulcanized body 10'. This latter effect is taken advantage of for the purpose of fixing or anchoring the bushing 12 in the body opening 11 against shift or displacement from the desired predetermined position thereof, whereby its ends are maintained spaced inwardly from adjacent lateral faces of the vulcanized body 10'. Due to said shrinkage of the rubber composition during vulcanization thereof, not only does the mass thereof contract about the circumference of the bushing 12, so as to tightly embrace and grip the latter, but, additionally, portions of the mass lying intermediate the bushing ends 13 and the adjacent lateral faces of the body, which, being unimpeded by the bushing, in contracting are more or less bulged over the external margins of the bushing ends 13, thereby forming annular keeper or stop shoulders 14 (see Figs. 2 and 3). These keeper or stop shoulders 14 respectively abut the opposite bushing ends 13, thus providing additional anchoring support of the bushing against endwise shift or displacement relative to the lateral faces of the vulcanized wheel body 10', thus assuring the desired spaced position of the bushing ends relative to said faces, so that the bushing cannot impede desirable lateral compression of the body 10' by clamping devices employed to affix the wheel to a driving spindle for use.

Figure 3:
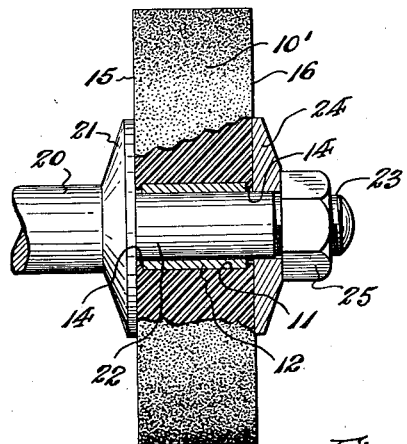
Fig. 3 is an elevational view in part section of the completed wheel as operatively assembled with and clamped to a power driven spindle for rotating the same.
Figure 4:
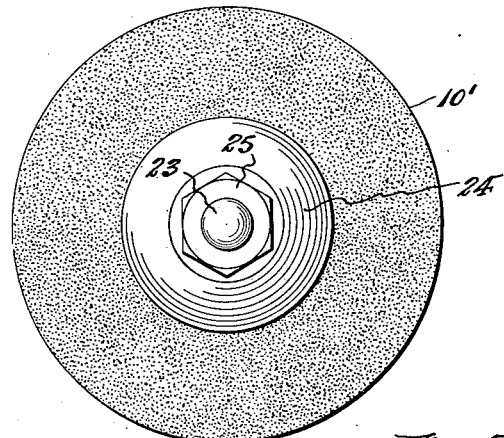
Fig. 4 is a face view of the assembly, viewed from the right in Fig. 3.

In the use of the novel vulcanized rubber bonded grinding wheel of this invention, the same is mounted on a power driven spindle 20 by which it is to be rotated (see Figs. 3 and 4). To affix the wheel to said spindle 20, the latter is usually provided with a stationary lateral flange 21 from which extends an axial shank 22, having a screw-threaded section 23 at its outer free end. The wheel 10' is engaged over said shank 22, with the bushing 12 interposed between the latter and the rubber composition of the wheel, with one lateral face 15 of said wheel abutting the stationary flange 21. The opposite lateral face 16 of the wheel is abutted by a movable clamp flange 24, which is engaged over the outer end of the shank 22. Said movable clamp flange 24 is retained in place by a keeper nut 25 which is screwed onto the threaded section 23 of the shank 22.

By tightening home the nut 25, said movable flange 24 is thrust strongly toward the stationary flange 21, thereby laterally compressing the rubber body 10' of the wheel between these flanges, so as to effect an exceedingly strong frictional engagement of the body 10' by said flanges, whereby driving torque of the spindle is transmitted to the wheel to operatively rotate the same. Since the ends 13 of the bushing 12 are inwardly spaced from the adjacent lateral faces 15 and 16 of the wheel, it will be obvious that the compressional gripping effect of the flanges 21—24 is in no way impeded. The wheel, as bushed for engagement with the spindle shank will be assured of running true without undue vibration, and with minimum risk of internal wear and consequent displacement.

Having now described my invention, I claim:

1. A vulcanized rubber bonded grinding wheel comprising a wheel body having a center opening, a rigid wear resistant bushing of less length than the width of said body entered within said center opening between the ends thereof so as to be embraced by the opening walls, with the bushing ends inwardly spaced relative to the adjacent lateral faces of the body, and annular bulged portions of said body, contiguous to the ends of the center opening thereof, adapted to provide annular keeper elements intermediate said lateral faces of the body and the bushing ends and disposed to externally overlap the latter in planes parallel thereto.

2. The method of producing an internally bushed vulcanized rubber bonded grinding wheel comprising preparing a wheel body from unvulcanized rubber stock and abrasive provided with a center opening, inserting a rigid wear resistant bushing of less length than the width of said body within said body opening, with the bushing ends inwardly spaced relative to the adjacent lateral faces of the body, and finally vulcanizing said body, whereby to both set the rubber constituent thereof and shrink the body into strong and tight embracing grip upon the bushing accompanied by formation of annular bulged portions contiguous to the ends of the center opening thereof and adapted to provide annular keeper elements intermediate said lateral faces of the body and the bushing ends and disposed to externally overlap the latter in planes parallel thereto.

FREDERICK W. FEILER.

REFERENCES CITED

The following references are of record in the file of this patent:

UNITED STATES PATENTS

| Number | Name | Date |
|---|---|---|
| 2,078,437 | Anderson | Apr. 27, 1937 |
| 2,121,656 | Fischer | June 21, 1938 |
| 2,304,226 | Work et al. | Dec. 8, 1942 |
| 2,360,132 | Hite | Oct. 10, 1944 |